US012759252B2

(12) United States Patent
Liesack et al.

(10) Patent No.: US 12,759,252 B2
(45) Date of Patent: Oct. 13, 2026

(54) METHOD FOR TEST PRESSING PELLETS IN A ROTARY PRESS

(71) Applicant: FETTE COMPACTING GMBH, Schwarzenbek (DE)

(72) Inventors: Patrick Liesack, Hamburg (DE); Werner Seifert, Wentorf (DE)

(73) Assignee: FETTE COMPACTING GMBH, Schwarzenbek (DE)

( * ) Notice: Subject to any disclaimer, the term of this patent is extended or adjusted under 35 U.S.C. 154(b) by 134 days.

(21) Appl. No.: 18/891,022

(22) Filed: Sep. 20, 2024

(65) Prior Publication Data

US 2025/0100242 A1 Mar. 27, 2025

(30) Foreign Application Priority Data

Sep. 21, 2023 (DE) ......................... 102023125660.2

(51) Int. Cl.
*B30B 11/08* (2006.01)
*B29C 43/00* (2006.01)
(Continued)

(52) U.S. Cl.
CPC ............ *B30B 3/045* (2013.01); *B29C 43/003* (2013.01); *B30B 11/08* (2013.01); *B30B 15/0094* (2013.01)

(58) Field of Classification Search
CPC ..... B30B 3/045; B30B 15/0094; B30B 15/26; B30B 15/32; B30B 11/005; B30B 11/08;
(Continued)

(56) References Cited

U.S. PATENT DOCUMENTS 5,517,871 A 5/1996 Pento
2005/0003038 A1* 1/2005 Meier ..................... B30B 11/08 425/411

FOREIGN PATENT DOCUMENTS

CN 107234831 A * 10/2017 ............. B30B 15/32
DE 10319024 B3 8/2004
(Continued)

*Primary Examiner* — Jimmy T Nguyen
(74) *Attorney, Agent, or Firm* — Perry + Currier Inc.

(57) ABSTRACT

A method for test pressing pellets in a rotary press, wherein the method includes the following steps: a punch pair of an upper and lower pressing punch assigned to a receptacle of the die plate is brought into a dosing position in which the upper pressing punch is moved upward out of the receptacle and the lower pressing punch is located partially in the receptacle, such that the lower pressing punch presets a maximum filling height of material to be compressed in the receptacle, material to be compressed is filled into the receptacles, the pressing units of the pressing apparatus are moved toward one another such that an expected web height of a pellet to be manufactured in the test pressing is reached before the punch pair exceeds the place of the smallest distance between the pressing units during a rotation of the rotor, the rotor is put into rotary motion such that the punch pair for compressing into a pellet the material filled into the receptacle comes into contact with the pressing units, wherein the pressing force and/or a parameter characterizing the pressing force is determined, upon reaching a preset pressing force and/or a preset value of the parameter characterizing the pressing force the rotor is arrested and rotated in the opposite direction, such that the punch pair comes out of contact with the pressing units.

12 Claims, 2 Drawing Sheets

(51) Int. Cl.
*B30B 3/04* (2006.01)
*B30B 15/00* (2006.01)

(58) Field of Classification Search
CPC . B29C 43/003; B29C 43/006; Y10S 100/906; Y10S 425/005
See application file for complete search history.

(56) References Cited

FOREIGN PATENT DOCUMENTS

| | | | |
|---|---|---|---|
| DE | 102005030311 | B3 | 11/2006 |
| DE | 102007052552 | A1 | 4/2009 |

* cited by examiner

METHOD FOR TEST PRESSING PELLETS IN A ROTARY PRESS

FIELD OF THE INVENTION

The invention relates to a method for test pressing pellets in a rotary press, comprising a rotationally driven rotor with upper and lower pressing punches, an upper and lower punch guide for the upper and lower pressing punches and a die plate between the punch guides, wherein in production operation of the rotary press the upper and lower pressing punches interact with the receptacles of the die plate, further comprising a filling apparatus into which material to be compressed is filled into the receptacles during production operation of the rotary press, further comprising a pressing apparatus with an upper pressing unit and a lower pressing unit, which interact with the upper and lower pressing punches during production operation such that the pressing units compress the material in the receptacles into pellets.

BACKGROUND OF THE INVENTION

Test pressings are performed, for example, for determining the optimal configuration parameters of the rotary press for new materials to be compressed, for manufacturing pellets in production operation. In particular, the pellets can be tablets. To press a tablet with the least possible product usage in the scope of a test pressing, so-called single-punch tablet presses are used, which have only one punch pair of an upper and a lower punch. These are presses designed specially for test pressings which often do not have a rotor and in particular are not intended or suitable for regular production operation for manufacturing pellets. With such test presses, all data within the scope of test pressings relevant for manufacturing tablets from the material in production operation is determined for a certain product, i.e. a certain material to be compressed. The data obtained must then be transferred to the respective rotary press intended for production operation and be adapted there to obtain the respectively desired characteristics of the tablets to be manufactured. The advantage of such single-punch test presses is that only very low product usage is required for the test pressing, in particular for one or multiple pellets to be manufactured in the scope of the test pressing. It is disadvantageous that a test press is to be provided for in addition to the rotary press intended for production operation. Moreover, the data generated cannot be transferred directly to the rotary press intended for production operation, in particular, due to different components of the presses. The generated data must therefore be adapted for the production press. For this adjustment, it is regularly necessary to perform further test pressings for the rotary press intended for production operation.

From DE 103 19 024 B3, a method for test pressing tablets in a rotary tableting machine is known, carried out in a rotary press intended for regular production operation. In this context, a punch pair selected for an individual pressing is automatically driven to a filling position and while the filling arrangement is at least partially moved away and the rotor is at standstill a die or a limited number of dies are filled with material. The rotor is then put into rotation and accelerated such that it has the desired production speed in the pressing station of the rotary press. After one revolution, the rotor is again arrested in the fill position. During the revolution of the rotor, signals or signal paths of the measurement points are recorded and entered into a computer for display and evaluation. With regard to this method, it is advantageous that a separate test press is not required for the test pressing. This reduces expenditure of effort. At the same time, the data obtained in the scope of the test pressing can be used directly and mostly without adjustment, since it was already generated on the rotary press intended for production operation. This also reduces expenditure of effort. Since only one or few dies are filled with material, the product usage required for the test pressing can be kept low at the same time. However, the web height of the generated tablet must be estimated for the first test pressing due to the filling quantity in the die. A pressing force which is initially unknown arises at the pressing station. The pressing force desired for the respective product must be determined accordingly in the scope of a series of test pressings. Expenditure of effort and product usage increase in turn as a result.

SUMMARY OF THE INVENTION

Departing from the explained prior art, the invention seeks to achieve the object of providing a method of the type mentioned at the outset which reliably and with low expenditure of effort enables a test pressing for setting a rotary press for production operation.

With regard to a method of the type mentioned at the outset, the invention achieves the object by means of the following steps:

- a punch pair of an upper and lower pressing punch assigned to a receptacle of the die plate is brought into a dosing position in which the upper pressing punch is moved upward out of the receptacle and the lower pressing punch is partially located in the receptacle, such that the lower pressing punch presets a maximum fill height of material to be compressed in the receptacle,
- material to be compressed is filled into the receptacle,
- the pressing units of the pressing apparatus are moved relative to one another such that an expected web height of a pellet to be manufactured in the test pressing is reached before the punch pair exceeds the place of the smallest distance between pressing units during a rotation of the rotor,
- the rotor is placed into rotary motion such that the punch pair comes into contact with the pressing units for compressing the material filled in the receptacle into a pellet, wherein the pressing force and/or a parameter characterizing the pressing force is determined,
- upon reaching a preset pressing force and/or a preset value of the parameter characterizing the pressing force, the rotor is arrested and rotated in the opposite direction, such that the punch pair comes out of contact with the pressing units.

The rotary press to be used with the method according to the invention is a rotary press provided for regular production operation of pellets, in particular tablets, from a material, in particular a powdered material. In the known manner, the rotary press comprises a rotor with a plurality of upper and lower pressing punches which are assigned in pairs respectively to a receptacle and/or a cavity of a die plate. The receptacles can be implemented as direct bores in the die plate. They can also be designed as sleeve-like inserts that are inserted into correspondingly larger receptacles of the die plate. During operation of the rotary press, the upper and lower pressing punches rotate together with the die plate, wherein their axial movement is controlled by means of control cams and is guided by means of upper and lower punch guides. The control cams usually interact with the punch heads of the pressing punches. In production operation, during the course of the rotation, the die plate travels through various apparatuses of the rotary press, namely a filling apparatus, in which powder material to be compressed is filled into the receptacles of the die plate, and a pressing apparatus, in which the upper and lower pressing punches are pushed into the receptacles by means of upper and lower pressing units, for example upper and lower pressing rollers or pressing wedges, for compressing the powder material into pellets, for example tablets. The pressing apparatus can have upper and lower pre-pressing units, for example pre-pressing rollers, and upper and lower main pressing units, for example main pressing rollers. Downstream of the pressing apparatus, the upper pressing punches are guided upward out of the receptacles and the pellets produced in the receptacles are pushed by the lower punches onto the upper side of the die plate. Ejector cams which move the lower pressing punches upward are provided for this purpose. By means of a scraper, for example, the pellets are then scraped off of the die plate into an output of the rotary press, from where they are supplied for further processing. The control cams usually also comprise dosing cams which when the upper pressing punch is guided upward out of the respective receptacle bring the lower pressing punch into a preset position partially guided into the receptacle. In this dosing position, the lower pressing punch constitutes a base of the respective receptacle and thus defines the maximum fill height of the material filled into the receptacle.

As explained in the preceding, the rotary press used in the method according to the invention is such a rotary press intended for regular production operation. As is explained in greater detail in the following, it can be adapted for performing the test pressing. In particular components of the rotary press, for example upper and lower pressing punches and/or the filling apparatus can be disassembled before beginning a test pressing. In the method according to the invention, a punch pair of upper and lower pressing punches assigned to a receptacle of the die plate is brought into the dosing position in which the upper pressing punch is moved as explained out of the receptacle and the lower pressing punch is partially located in the receptacle, such that it presets the maximum fill height of the material to be compressed in the receptacle. In the dosing position of the punch pair, the rotor can be at standstill. Next, the material to be compressed, which can be powdered in particular, as explained, is filled into the receptacle. In a particularly practical manner, the punch pair can be brought into the dosing position by a corresponding rotation of the rotor. But it is also possible for the punch pair to be intentionally mounted in the rotor at the dosing position.

In the method according to the invention, the upper and lower pressing units of the pressing apparatus are furthermore moved toward one another to an extent that an expected web height of a pellet to be manufactured in the test pressing, in particular a tablet, is reached before the punch pair exceeds the place of the smallest distance between the pressing units during a rotation of the rotor, in particular before the punch pair reaches the place of the smallest distance between the pressing units during a rotation of the rotor. In this context, the web height corresponds to the height of the jacket surface of the pellet, i.e. the section, in particular cylindrical, of the pellet. It is also referred to as cylindrical height. The web height is, in particular, the section of the pellet that is not impressed by the shape of the punch tips of the pressing punch compressing the pellet. Thus pressing punches arranged opposite one another move toward one another in the course of a pressing process up to a smallest distance that corresponds to the web height. For example a convex deviation in shape of the pellet, above or below the jacket surface is not taken into account. The web height of the manufactured pellet thus results from the smallest distance that occurs between the upper and lower punch during the pressing process. Accordingly, when the axial punch length is given, the web height is defined by the distance between the pressing units.

As explained, the upper pressing unit can be an upper pressing roller or an upper pressing wedge, and the lower pressing unit can be a lower pressing roller or a lower pressing wedge.

During the course of rotation of the rotor, a punch pair comes into contact with the pressing units of the pressing apparatus. Dictated by the geometry of the pressing units, the distance between the pressing units decreases in the rotation direction of the rotor and/or of the punch pair. For example, for pressing rollers the punch pair runs against the rising radius of the pressing rollers during the course of the rotor rotation. The distance between the pressing units decreases with further rotation of the rotor until the punch pair reaches a smallest distance between the pressing units. For example, with pressing rollers this is reached when the punches of the punch pair lie with their longitudinal axes on an imaginary line between the axes of rotation of pressing rollers arranged opposite one another. During the course of the further rotation of the rotor, the distance between the pressing units increases again and the punches of the punch pair are guided away from one another. By guiding together the pressing units such that an expected web height of a pellet to be manufactured in the test pressing is reached before the stamp pair exceeds the place of the smallest distance between the pressing units during a rotation of the rotor, it is ensured that the pressing process is completed up to the desired maximum pressing force on a rising geometry of the pressing units, for example a rising radius of the pressing rollers, i.e. in the region of the reducing distance between the pressing units. For the test pressing, the rotor of the rotary press is brought into rotary motion such that the punch pair for compressing the material guided into the receptacle comes into contact with the pressing units. During the pressing process effected by the contact of the upper and lower pressing punches with the upper and lower pressing units, the pressing force and/or a parameter characterizing the pressing force is determined. In the test pressing, as explained, the punch pair is brought into contact with the pressing units by the rotary motion of the rotor and further guided against the rising geometry of the pressing units. Due to the continued rotary motion of the rotor, the upper and lower pressing punches follow as in a regular production pressing of the pressing unit geometry and accordingly execute a vertical movement toward one another. Thereby the material located in the receptacle is compressed into the pellet. Once it is determined on the basis of the detected values that a preset pressing force and/or a preset value of the parameter characterizing the pressing force has been reached, the rotary motion of the rotor is stopped and the rotor is again rotated in the opposite rotary direction such that the punch pair again comes out of contact with the pressing units. The pellet created can be removed from the receptacle manually, for example. In this context, the axial motion of the upper and lower pressing punches is guided by the control cams of the rotary press together with the upper and lower punch guides. In this context, the rotor can be rotated back into the dosing position of the punch pair. It is also possible, however, to bring the rotor into another rotary position in which, for example, it is especially easy to remove the manufactured pellet, for example an ejection position in which the lower pressing punch conveys the pellet to the upper side of the die plate.

The method according to the invention allows a test pressing of individual tablets with minimal product usage of the material to be compressed on a rotary press intended for regular production operation. The data generated in the scope of the test pressing is thus directly available in the system of the rotary press intended for production operation. Neither a data transfer from a separate test press nor an adaptation of the data to the rotary press intended for production operation is necessary. Dispensing with a test press means there is lower expenditure of effort for installation. The test pressing itself also only requires minor expenditure of effort for installation. Insofar as, according to the invention, the pressing units of the pressing apparatus are guided together to an extent that would exceed the pressing force desired for the respective material during a complete pass of the pressing apparatus, it can be reliably ensured during the test pressing, on the basis of determining the pressing force or the parameter characterizing the pressing force, that the preset pressing force is reached and not exceeded. Once the desired pressing force is reached, the pressing process is ended by stopping the rotary motion of the rotor and the punch pair is guided out of the pressing unit in the opposite direction, in particular out of contact with the pressing units. The pressing process occurs completely before the punch pair has exceeded the smallest distance between the pressing units. Thus the first pellet of a test pressing can already be pressed with the desired pressing force, even without knowledge of the compression behavior of the respective material to be compressed, i.e. regardless of what web height the pellet reaches. The desired pressing force can be determined before the test pressing and can be precisely reached with the method according to the invention.

The method according to the invention can be carried out, except for a manual filling of the receptacle, controlled by a control apparatus of the rotary press, in particular automatically. The control apparatus can be constituted by, or respectively integrated into, the machine controller for controlling the rotary press in production operation. Based on the results of the test pressing, the rotary press can be configured with all components for subsequent production operation. This too can be done through the control apparatus. This relates, for example, to the desired setting of the dosing cams and/or of the pressing apparatus, in particular of the pressing units, such as pressing rollers or pressing wedges, and/or of the rotational speed of the rotor. The pressing force, or respectively the parameter characterizing the pressing force, can be measured by means of corresponding sensors. For this purpose, the rotary press can have corresponding sensors, for example pressing force sensors on the pressing apparatus, for example arranged on the pressing units. The parameter characterizing the pressing force and/or determined further parameters, as the case may be, can also be measured by means of corresponding sensors of the rotary press.

It is not necessary for the method steps of the method according to the invention to be performed in the sequence. In particular, the pressing units can be moved relative to one another at the same time as or before the punch pair is brought into the dosing position, or at the same time as or before the material to be compressed is filled into the receptacle.

According to one embodiment, the parameter characterizing the pressing force can be a rotational position of the rotor, a web height, a pressing force curve and/or a pressing dwell time at a preset pressing force. The rotational position of the rotor is usually ascertained by the angle position of the rotor. The web height can be determined, for example, by the axial path of the upper and of the lower pressing punch. The pressing dwell time describes the time period during which the pellet is squeezed to the smallest volume. The path of the pressing punches thus does not change anymore during the pressing dwell time. The pressing force curve can be ascertained by time or, for example, by rotor rotation.

The pressing force and/or the parameter characterizing the pressing force can be taken into account for setting the rotary press for production operation, as explained.

According to another embodiment, it can be provided that during the test pressing and/or after the test pressing, further parameters are determined, comprising the pressing force curve, the punch path curve of the upper and/or lower pressing punch, the maximum pressing force, the pressing dwell time at a preset pressing force, and/or the web height of the manufactured pellet. Once again, suitable sensors can be provided for measuring the further parameters, as explained at the outset. Further parameters can also be determined after the test pressing, for example a measurement of the actual web height of the manufactured pellet.

The further parameters can also be taken into account for setting the rotary press for production operation. As explained in the preceding, the values, or respectively parameters, determined according to the invention can be used already in the rotary press intended for production operation and can be used directly to characterize the material to be compressed, or respectively to set the setting of the rotary press for production operation with the material in dependence upon the material to be compressed.

According to another embodiment, it is possible that only the punch pair assigned to the receptacle of the die plate is installed in the rotor during the test pressing. The remaining punch pairs of the rotor can be disassembled. Naturally, it is also possible to leave some of the punch pairs of the rotor in the rotor and to demount some punch pairs or to leave all punch pairs in the rotor. Having only the punch pair used for the test pressing present has the advantage that moreover there is no interaction of punch pairs with components of the rotary press, for example when no material is filled into the receptacles to which the punch pairs are assigned.

According to another embodiment, the filling apparatus of the rotary press can be disassembled or deactivated during the test pressing. This has the advantage that receptacles not used during the test pressing are not filled with material to be compressed when this is undesirable. For example, it is possible to completely or partially demount the filling apparatus from the rotor. It can also be emptied or a filling opening through which the material is filled from the filling apparatus into the receptacles can be sealed. Labor-intensive measures for preventing receptacles from being filled, for example inserting blind die plates can thus be avoided.

According to an especially practical embodiment, the material to be compressed in the test pressing can be manually filled into the receptacle. However, it is also conceivable to fill the material into the receptacle through the filling apparatus or another filling device.

According to another embodiment, in the test pressing the rotor can be rotationally driven with at least one third of the rotational speed reached during production operation of the rotary press. The rotor can also be rotationally driven up to the full production speed in production operation. Using a rotational speed according to the last-mentioned embodiment creates especially representative test conditions for the subsequent production operation. Usual production speeds of a rotor of a rotary press can be between 5 and 120 revolutions/min, for example.

According to another embodiment, multiple test pressings can be carried out, wherein the pressing force progression and/or the punch path progression is varied by a variation of the rotational speed of the rotor. For example, sinusoidal and/or sawtooth and/or square pressing force progressions and/or punch path progressions can be set over the time or rotor rotation. The variable actuation of the rotary drive of the rotor easily allows for setting different pressing force curves or punch path curves. Finding the optimal setting of the rotary press for the subsequent production operation is thus facilitated.

According to another embodiment, multiple test pressings can be carried out, wherein punch pairs with different punch head and/or punch tip geometries can be used. In production operation, the punch tips of the pressing punches dip into the receptacles of the die plate for compressing the material into pellets. They are arranged at one end of the pressing punches. The punch heads, which interact with the control cams for controlling the axial motion of the pressing punches, are arranged at the opposite end. In this manner, the rotary press can be preconfigured for different punch heads or punch tip shapes. The respectively optimal operating parameters for production operation can be stored in a control apparatus of the rotary press, such that a user can select these, for example by specifying the respectively equipped punch type. It is also possible to simulate various punch shapes for setting the rotary press by modeling the motion of the pressing punch and/or the speed curve during the pressing process using the rotor rotational speed.

BRIEF DESCRIPTION OF THE DRAWINGS

An exemplary embodiment of the invention is explained below in greater detail with reference to figures. The figures show schematically.

The same reference signs refer to the same objects in the figures unless indicated otherwise.

DESCRIPTION OF EMBODIMENTS OF THE INVENTION

Figure 1:
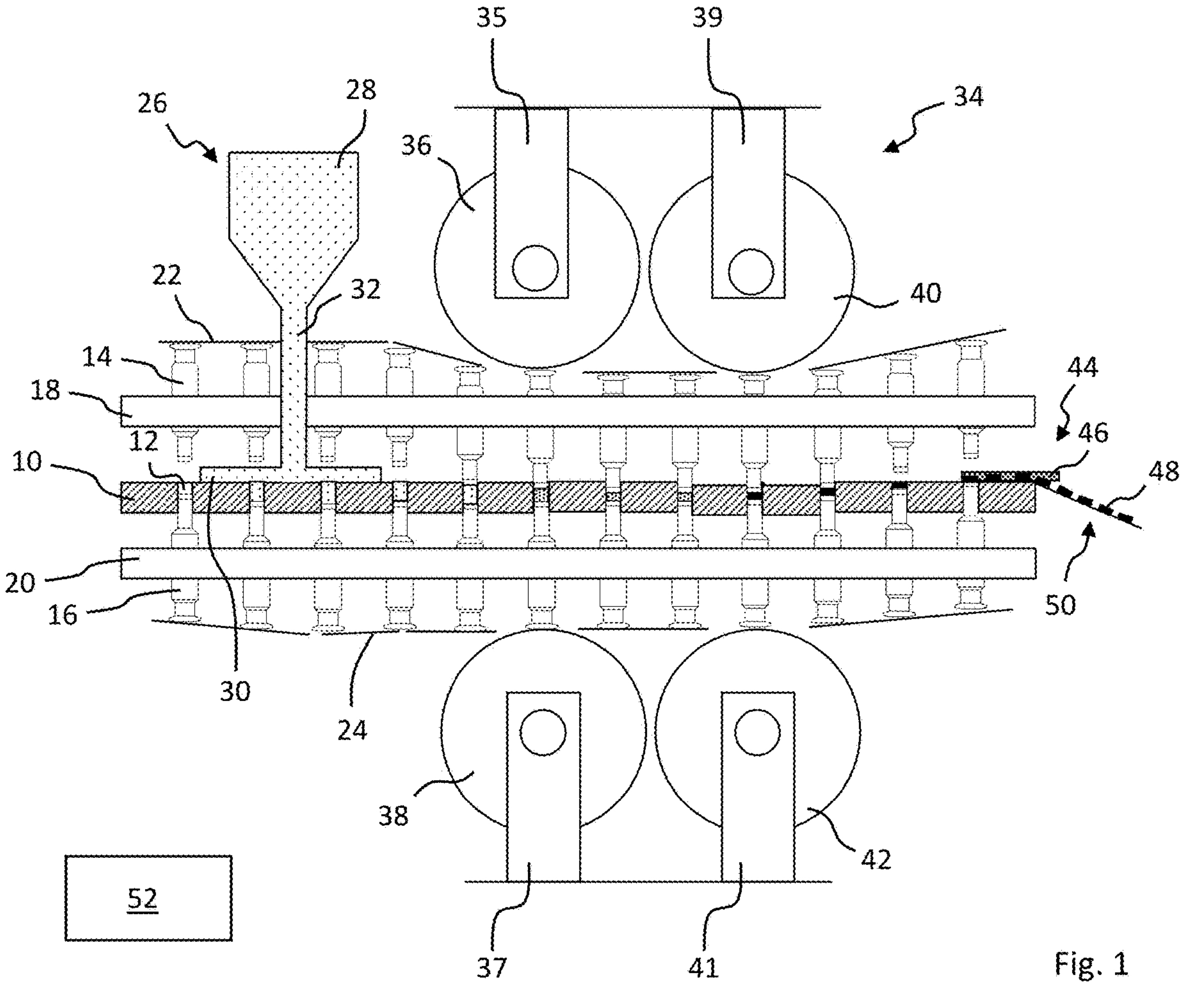
FIG. 1 schematically shows a rotary press used in the method according to the invention in an unrolled representation of the rotor, FIG. 2 an enlargement by sections of parts of the rotary press represented in FIG. 1 for illustrating the method according to the invention.

The rotary press shown in FIG. 1 is a rotary press for manufacturing tablets, as can be used in the present invention, and in which powdered material is compressed into pellets, particularly tablets. The rotor of the rotary press is rotationally driven by a rotary drive and comprises a die plate 10 having multiple receptacles 12. The receptacles 12 can be formed, for example, by bores in the die plate 10. The rotor further comprises multiple upper pressing punches 14 and lower pressing punches 16 which revolve synchronously with the die plate 10. The upper pressing punches 14 are axially guided in an upper punch guide 18 and the lower pressing punches 16 are axially guided in a lower punch guide 20. The axial movement of the upper pressing punches 14 and lower pressing punches 16 in the course of the rotation of the rotor is controlled by upper control cam elements 22 and lower control cam elements 24. A filling apparatus 26 is further provided, which has a filling reservoir 28 and a filling chamber 30 which are connected via a filling pipe 32. In this manner, in the present example, powdered material arrives due to gravity from the filling reservoir 28 via the filling tube 32 in the filling chamber 30 and from there via a filling opening provided on the lower side of the filling chamber 30 into the receptacles 12 of the die plate 10.

The rotary press further comprises a pressing apparatus 34. In the example represented, the pressing apparatus 34 comprises a pre-pressing apparatus with an upper pressing roller 36 held on an upper holder 35 and a lower pressing roller 38 held on a lower holder 37, as well as a main pressing apparatus with an upper pressing roller 40 held on an upper holder 39 and a lower pressing roller 42 held on a lower holder 41. Furthermore, the rotary press comprises an ejector apparatus 44 and a scraper apparatus 46 having a scraper element which supplies the tablets 48 produced in the rotary press to a discharge apparatus 50 for discharging from the rotary press. The scraper apparatus 46 can, for example, comprise a preferably crescent-shaped scraper element which scrapes tablets 48 conveyed by the lower pressing punches 16 onto the upper side of the die plate 10 in the region of the ejector apparatus 44 off of the die plate 10 and supplies them to the discharge apparatus 50.

The rotary press further comprises a control apparatus 52 for controlling the operation of the rotary press and for carrying out the method according to the invention, as explained in greater detail below.

Figure 2:
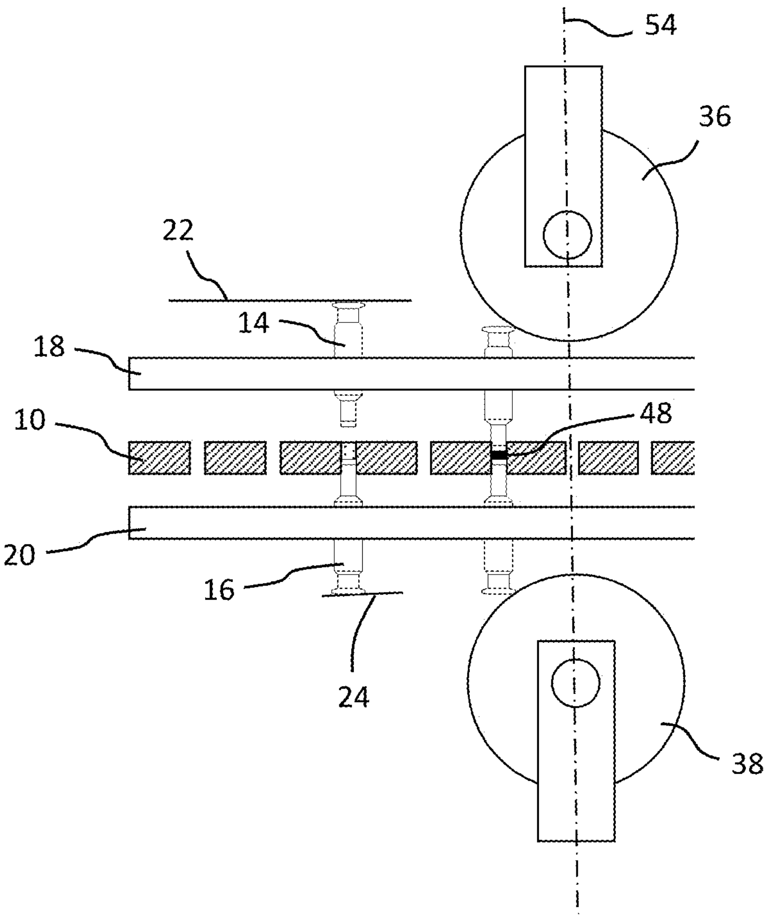

FIG. 2 shows a part of the rotary press represented in FIG. 1 for illustrating the method according to the invention. In this context, only an upper control cam element 22 and a lower control cam element 24 are shown, as well as only two punch pairs of the upper and lower pressing punches 14, 16 as well as only the upper pressing roller 36 and the lower pressing roller 38 of the pre-pressing apparatus of the pressing apparatus 34. For carrying out the method, it is possible, for example, for only one punch pair of the upper and lower pressing punches 14, 16 to be mounted in the rotor. FIG. 2 shows two punch pairs for illustrating different method steps of the method.

The punch pair represented on the left in FIG. 2 of the upper and lower pressing punches 14, 16, is located in the dosing position in which the upper pressing punch 14 is moved upward out of the receptacle 12 of the die plate 10, the receptacle 12 being assigned to the punch pair, in particular by the upper control cam element 22 represented in FIG. 2. The lower pressing punch 16, controlled by the control cam element 24 which is, in particular, a dosing cam element 24, is located partially in the receptacle 12 and thereby defines a maximum fill height of the receptacle 12 for the material filled into the receptacle 12. In this dosing position, the material is filled manually into the receptacle 12 when the rotor is arrested, for example. In this context, the receptacle 12 is filled completely up to its upper edge. If applicable, excess material can be scraped off of the upper side of the die plate 10.

Then the rotor is put into rotary motion, such that the punch pair moves to the right in FIG. 2 with the rotation of the die plate 10 and comes into contact with the pressing rollers 36 and 38, as is evident for the punch pair represented at the right in FIG. 2. The pressing rollers 36, 38 were previously moved toward one another to an extent, such that an expected web height of a pellet to be manufactured in the test pressing is reached before the punch pair exceeds, in particular reaches, the place of the smallest distance between the pressing rollers 36, 38 during a rotation of the rotor. The invention ensures that in the scope of the test pressing, the upper and lower pressing punches 14, 16 definitely do not exceed, in particular do not reach, the imaginary connection line 54 drawn in FIG. 2 between the axes of rotation of the pressing rollers 36, 38.

This setting of the pressing rollers 36, 38 ensures that a preset maximum pressing force is reached at the pressing apparatus 34, in particular at the upper and lower pressing rollers 36, 38, before the upper and lower pressing punches 14, 16, during the course of their rotary motion, exceed the region of the smallest distance between the pressing rollers 36, 38. The pressing force and/or a parameter characterizing the pressing force is measured during the contact between the pressing punches 14, 16 and the pressing rollers 36, 38, in particular by means of suitable sensors of the rotary press. Upon reaching a preset pressing force and/or a preset value of the parameter characterizing the pressing force, the rotary motion of the rotor is stopped and the rotor then rotates in the opposite direction, such that the punch pair again comes out of contact with the pressing rollers 36, 38. The manufactured pellet 48 can then be removed from the receptacle 12 of the die plate 10. The ascertained values can be used for setting the rotary press for production operation with the material compressed in the scope of the test pressing.

As is evident from the explanations in the preceding, with the present rotary press, the test pressing is carried out with the pressing rollers 36, 38 of the pre-pressing apparatus of the pressing apparatus 34. Naturally, the test pressing can be carried out in the same manner with the pressing rollers 40, 42 of the main pressing apparatus of the pressing apparatus 34, either with a rotary press that does not have a pre-pressing apparatus or insofar as the pressing rollers 36, 38 of the pre-pressing apparatus are moved away from one another sufficiently such that the punch pair of the upper and lower pressing punches 14, 16 either does not come into contact with this at all or only to an extent that is not sufficient for reaching the preset pressing force or the value of the parameter characterizing the pressing force.

LIST OF REFERENCE SIGNS

10 Die plate
12 Receptacle
14 Upper pressing punches
16 Lower pressing punches
18 Upper punch guide
20 Lower punch guide
22 Upper control cam element
24 Lower control cam element
26 Filling apparatus
28 Filling reservoir
30 Filling chamber
32 Filling tube
34 Pressing apparatus
36 Upper pressing roller
38 Lower pressing roller
40 Upper pressing roller
42 Lower pressing roller
44 Ejector apparatus
46 Scraper apparatus
48 Pellet
50 Discharge apparatus
52 Control apparatus
54 Connection line

The invention claimed is:

1. A method for test pressing pellets in a rotary press comprising a rotationally driven rotor with upper and lower pressing punches, an upper and lower punch guide for the upper and lower pressing punches and a die plate between the punch guides, wherein in production operation of the rotary press the upper and lower pressing punches interact with receptacles of the die plate, further comprising a filling apparatus into which material to be compressed is filled into the receptacles during production operation of the rotary press, further comprising a pressing apparatus with an upper pressing unit and a lower pressing unit, which interact with the upper and lower pressing punches during production operation such that the pressing units compress material located in the receptacles into pellets, wherein the method comprises the following steps:

a punch pair of an upper pressing punch and a lower pressing punch assigned to a receptacle of the die plate is brought into a dosing position in which the upper pressing punch is moved upward out of the receptacle and the lower pressing punch is partially located in the receptacle, such that the lower pressing punch presets a maximum fill height of material to be compressed in the receptacle, material to be compressed is filled into the receptacle, the pressing units of the pressing apparatus are moved relative to one another such that an expected web height of a pellet to be manufactured in the test pressing is reached before the punch pair exceeds a place of the smallest distance between the pressing units during a rotation of the rotor, the rotor is placed into rotary motion such that the punch pair comes into contact with the pressing units for compressing the material filled in the receptacle into a pellet, wherein a pressing force and/or a parameter characterizing the pressing force is determined, upon reaching a preset pressing force and/or a preset value of the parameter characterizing the pressing force, the rotor is arrested and rotated in an opposite direction, such that the punch pair comes out of contact with the pressing units.

2. The method according to claim 1, wherein the parameter characterizing the pressing force can be a rotational position of the rotor, a web height, a pressing force curve and/or a pressing dwell time at a preset pressing force.

3. The method according to claim 1, wherein the pressing force and/or the parameter characterizing the pressing force is taken into account for setting the rotary press for production operation.

4. The method according claim 1, wherein during the test pressing and/or after the test pressing, further parameters are determined, comprising a pressing force curve, a punch path curve of the upper and/or lower pressing punch, a maximum pressing force, a pressing dwell time at a preset pressing force, and/or a web height of the manufactured pellet.

5. The method according to claim 4, wherein the further parameters for setting the rotary press for production operation are taken into account.

6. The method according to claim 1, wherein only the punch pair assigned to the receptacle of the die plate is installed in the rotor during the test pressing.

7. The method according claim 1, wherein the filling apparatus is disassembled or deactivated during the test pressing.

8. The method according claim 1, wherein the material to be compressed in the test pressing is filled manually into the receptacle.

9. The method according to claim 1, wherein in the test pressing the rotor is rotationally driven with at least one third of a rotational speed reached during production operation of the rotary press.

10. The method according to claim 1, wherein multiple test pressings can be carried out, wherein a pressing force curve and/or a punch path curve is varied by a variation of a rotational speed of the rotor.

11. The method according to claim 10, wherein sinusoidal and/or sawtooth-shaped and/or square-shaped pressing force curves and/or punch path curves are set.

12. The method according to claim 1, wherein multiple test pressings are carried out, wherein punch pairs with different punch head geometries and/or punch tip geometries are used.

* * * * *